April 7, 1970  J. C. ENGEL  3,505,562
SINGLE TRANSISTOR INVERTER WITH A GAS TUBE CONNECTED
DIRECTLY TO THE TRANSISTOR
Filed April 29, 1968

WITNESSES:
Bernard R. Gieguay
James T. Young

INVENTOR
Joseph C. Engel
BY
ATTORNEY

United States Patent Office 3,505,562
Patented Apr. 7, 1970

3,505,562
SINGLE TRANSISTOR INVERTER WITH A GAS TUBE CONNECTED DIRECTLY TO THE TRANSISTOR
Joseph C. Engel, Pittsburgh, Pa., assignor to Westinghouse Electric Corporation, Pittsburgh, Pa., a corporation of Pennsylvania
Filed Apr. 29, 1968, Ser. No. 724,698
Int. Cl. H03b 7/06; H05b 41/18, 41/29
U.S. Cl. 315—206         10 Claims

ABSTRACT OF THE DISCLOSURE

A inverter circuit operative with a D.C. source for supplying a load, such as a fluorescent lamp having a negative resistance characteristic. The inverter circuit utilizes a single active element which may comprise a transistor operative in a switching mode. The load is connected across the transistor and receives current via a ballast inductor from the D.C. source when the transistor is rendered non-conductive. A sensing inductor is provided which is inductively coupled to the ballast inductor and supplies the voltage to a detector, which comprises a peak-to-peak detector whose output is proportional to the voltage developed across the load, the output of the detector is used to control the switched state of the active element.

BACKGROUND OF THE INVENTION

The present invention relates to inverter circuitry and, more particularly, to inverter circuits utilizing only a single active element.

It would be highly desirable to provide an efficient and inexpensive inverter for operating a fluorescent lamp from a low D.C. voltage supply. One application of such an inverter would be in a battery-powered portable fluorescent lantern which could be used outdoors for hunting, fishing, etc., or for emergency uses at home or associated with the automobile. Another desirable application of such an inverter would be for supplying the operating power for automobile interior or instrument panel lighting, or for appliance lighting such as refrigeration interior lighting. Presently known designs for such inverter applications, however, have proven expensive as well as relatively inefficient. For minimum costs it is desirable to utilize an inverter design employing only a single active element such as a transistor operative in a switching mode. Most single transistor inverter designs utilize a basic blocking or relaxation oscillator design wherein a transformer is used, and the fluorescent lamp is connected in series with a capacitive ballast in the secondary of the transformer. The capacitive load as seen by the switching transistor, however, results in a large pulse current flow from the battery supply through the transistor. For example, in a typical design, a four ampere current pulse might be drawn from a twelve-volt battery for operating a four-watt fluorescent lamp. Therefore, such a design employing a capacitive ballast results in both poor inverter efficiency and poor transistor utilization since the transistor operates under a very unfavorable peak-to-average current ratio. It would also be highly desirable if the inverter circuit for supplying a fluorescent lamp would provide a substantially constant light output independent of variations in the D.C. supply voltage.

SUMMARY OF THE INVENTION

The present invention relates to an inverter circuit for supplying a load from a D.C. source wherein a switching device is utilized, with the load being connected thereacross. A first inductive element is utilized for supplying current to the load from the D.C. source in response to the switched state of the switching device. A second inductive element inductively coupled to the first inductive element supplies a sensed voltage to detecting means which is operative for developing a control voltage proportional to the voltage appearing across the load. The control voltage is applied to the switching device for controlling the switches thereof.

DESCRIPTION OF THE PREFERRED EMBODIMENT

Figure 1:
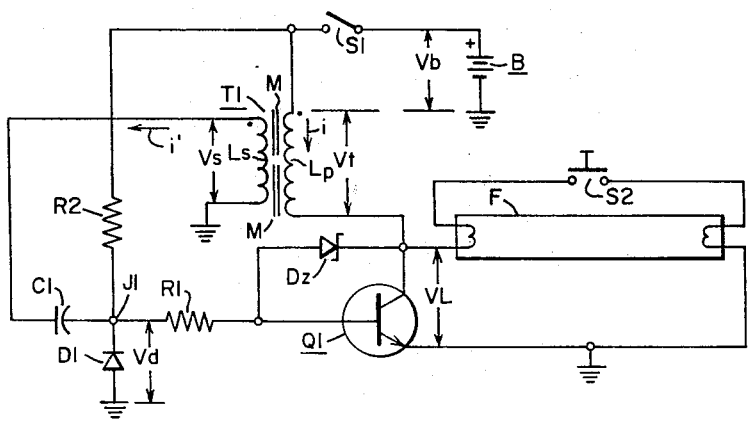
FIGURE 1 is a schematic diagram of the inverter circuit of the present invention.

Referring to the schematic of FIGURE 1, a single transistor inverter is shown employing a transistor Q1 operative with a battery source B for supplying operating power to a fluorescent lamp F. Considering also the waveform diagram of FIGURE 2, assume that a time somewhat before the time a switch S1, connecting the positive electrode of the battery B to the remainder of the inverter circuit, has been closed and also that the fluorescent light F has been ignited. An inductive coil $L_p$, which forms the primary winding of a transformer T1, is connected via the switch S1 to the postive electrode the battery B, which supplies an output voltage $V_b$ thereacross, with the negative electrode of the battery being grounded. At the beginning of a cycle of operation, at the time t0 being grounded being applied to an inductive coil $L_p$ which on FIG. 2, the voltage $V_b$ causes a current $i$ to flow into the dotted end of the primary winding $L_p$. The current $i$ is shown in Curve A of FIGURE 2. In response to the current flow into the dotted end of the winding $L_p$, there is a current flow $i'$ out of the dotted end of an inductive coil $L_s$, which forms the secondary winding of the transformer T1. The undotted end of the winding $L_s$ is grounded and the dotted end thereof is coupled via a capacitor C1 and a resistor R1 to the base electrode of the transistor Q1.

The current flow from the dotted end of the winding $L_s$ through the capacitor C1 and resistor R1 to the base of the transistor Q1 thereby turns on the transistor Q1, with additional base current being supplied to the transistor Q1 via a resistor R2 connected between the battery B and a junction point J1 between the capacitor C1 and the resistor R1. The emitter electrode of the transistor Q1 is grounded with the fluorescent light F having one side connected to the collector electrode of the transistor Q1 at the undotted end of the winding $L_p$ and the other end grounded. Thus, the fluorescent light F is directly connected across the collector-emitter circuit of the transistor Q1 and has developed thereacross a voltage VL which is shown in Curve B of FIGURE 2. The voltage VL is shown to be zero between the times t0 and t1 with the transistor Q1 conductive. When the transistor Q1 is conductive, the source voltage $V_b$ appears across the primary winding $L_p$ of the transformer T1, with the voltage Vt across the winding $L_p$ being equal to the source voltage $V_b$. The voltage Vt is shown in Curve C of FIGURE 2.

Figure 2:
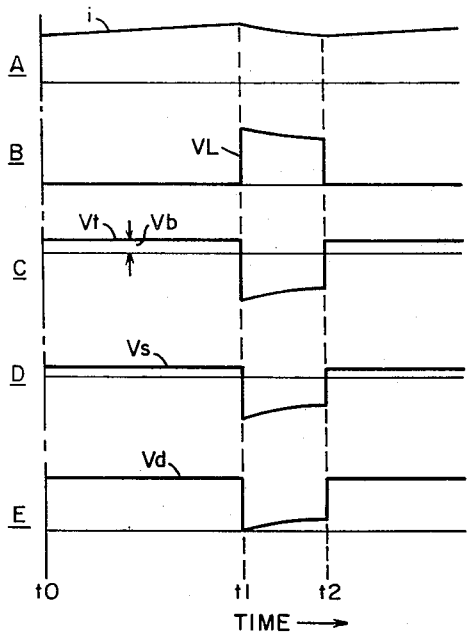
FIG. 2 is a waveform diagram including curves A, B, C, D and E utilized in explaining the operation of FIG. 1.

The voltage Vs developed across the secondary winding $L_s$ of the transformer T1 is shown in Curve D of FIGURE 2 and bears a direct relationship with the primary voltage Vp by the turns ratio of the transformer T1. With the voltage $V_b$ being applied across the winding $L_p$, a linearly increasing magnetizing current $i$ will pass therethrough and through the collector-emitter circuit of the transistor Q1. See Curve A of FIGURE 2.

The transformer T1 includes a core of magnetic material M for inductively coupling the primary winding $L_p$ and the secondary winding $L_s$. The core M includes a sufficiently large air gap to prevent the saturation thereof under normal operating conditions of the inverter. It should be noted that this is in distinction to the normal operation of a blocking or relaxation oscillator wherein the saturation of the magnetic core of the transformer thereof is necessary to effect the turn-off of the switching device utilized. In the circuit of FIGURE 1 turn-off of the transistor Q1 is not brought about by the saturation of the core M but rather is due to the reduction of base current to the transistor Q1 as the capacitor C1 begins to charge. The reduction of base current to the transistor Q1 causes the voltage appearing across the collector-emitter circuit thereof to increase. In response to the increase of voltage across the transistor Q1, the voltage $Vt$ across the winding $Lp$ of the transformer T1 decreases reducing the voltage $Vs$ across the secondary winding $Ls$ and thereby further decreasing the base current supplied to the transistor Q1. This action continues in a rapid regenerative manner until insufficient base current is supplied to the transistor Q1 to maintain conduction, and the transistor is turned off. This occurs at the time $t1$ as shown in FIGURE 2.

At the time $t1$, with the turning off of the transistor Q1, the magnetizing current $i$ is switched from the transistor Q1 to the fluorescent lamp F. The current $i$ thus acts as energizing current for the fluorescent lamp load with the magnitude thereof being limited by the impedance of the inductive coil $Lp$ now acting as a ballast element for the fluorescent lamp.

The load current $i$ as applied to the fluorescent lamp F is shown between the times $t1$ and $t2$ in Curve A of FIGURE 2 where it exponentially decreases between these times having a time constant determined by the ratio of the magnetizing inductance of the transformer T1 and the load resistance. The load current $i$ will begin to approach a steady state value determined by the supply voltage $Vb$ and the load resistance of the fluorescent lamp F. The voltage $VL$ across the fluorescent lamp F is shown in Curve B of FIGURE 2 to increase rapidly at the time $t1$ with the turn off of transistor Q1 and then to decay until the time $t2$.

As shown in Curve C of FIGURE 2 the voltage $Vt$ across the winding $Lp$ of the transformer T1 reverses polarity from positive to negative at the time period $t1$ due to the positive voltage $VL$ of higher magnitude than the source voltage $Vb$ appearing across the fluorescent lamp F. The voltage $Vs$ across the secondary winding $Ls$ of the transformer T1 also reverses to a negative polarity as shown in Curve D of FIGURE 2 at the time $t1$. The capacitor C1 which has been previously charged has a discharge path provided therefor through the loop formed by the secondary winding $Ls$, the capacitor C1 and a diode D1, which is connected with its cathode at the junction J1 and its anode at ground. The time constant for the discharge of the capacitor C1 is determined by the product of the capacitance value of the capacitor C1 and the resistance as seen looking into the secondary of the transformer T1. During this discharge time the base of the transistor Q1 is clamped to a slightly negative voltage through the resistor R1 due to the clamping action of the diode D1.

The voltage $Vd$ appearing across the diode D1 between the junction point J1 and ground is shown in Curve E of FIGURE 2. This voltage $Vd$ is applied, via the resistor R1, across the base-emitter electrodes of the transistor Q1. It should be noted that the voltage $Vd$ is the peak-to-peak detected value of the voltage $Vs$ appearing across the secondary winding $Vs$, with the negative excursion of the voltage $Vs$ being clamped to ground and the waveform $Vd$ being positive with respect thereto.

When the capacitor C1 has discharged sufficiently, the decreasing reverse voltage $Vt$ across the primary winding $Lp$ of the transformer T1 will cause the reversal of the capacitor current which will in turn tend to turn the transistor Q1 on by supplying base current to the base electrode thereof. As the transistor Q1 turns on, the current $i$, as shown in Curve A of FIGURE 2, is switched back to the collector-emitter circuit of the transistor Q1. The voltage $Vt$ across the winding $Lp$ is thus further reduced, and the transistor Q1 is turned on harder, with the regenerative action continuing until the transistor Q1 is fully saturated at the time $t2$. One complete cycle of operation is completed at the time $t2$ with the magnetizing current $i$ beginning its linear increase with the source voltage $Vb$ appearing across the winding $Lp$ as previously described.

The operation of subsequent cycles will proceed as described above with the transistor Q1 being alternately turned on and turned off to supply the load voltage $VL$ across the fluorescent lamp F during each of these cycles.

A push buttom switch S2 is connected directly across the fluorescent lamp F to strike initially the lamp by supplying sufficient filament heating therefor. Thus, when the lamp is initially to be turned on, the push button switch S2 is momentarily closed to provide a current path to the filament of the fluorescent lamp F.

The circuit of FIGURE 1 is self-protecting against high supply voltage conditions and tends to stabilize the transformer current under such conditions. Thus, if the magnetizing current $i$ were to increased beyond its normal magnitude, this will cause the core M of the transformer T1 to begin to saturate. The secondary voltage $Vs$ of the transformer T1 will thus decrease, which causes the transistor Q1 to be turned off thereby prohibiting any further increase in the magnetizing current $i$.

Another protective feature of the inverter circuit of FIGURE 1 is the use of a Zener diode Dz connected from anode to cathode between the base and collector electrodes, respectively, of the transistor Q1 to protect the collector-base junction from reverse voltage damage if the fluorescent lamp F should be removed from the circuit or should fail. The Zener diode Dz is so selected that it will conduct if any excess voltage appears across the collector-base junction of the transistor Q1 thereby protecting this junction.

The inverter of FIGURE 1 is self-regulating and provides a substantially constant current to the fluorescent light F substantially independent of operating voltage $Vb$, which is highly desirable due to variations of the output voltage of the battery B. This is accomplished by peak-to-peak detecting the voltage $Vs$ developed across the secondary winding $Ls$ in a peak-to-peak detector including the capacitor C1 and the diode D1. The peak-to-peak detected output voltage $Vd$, as shown in Curve E of FIGURE 2, is applied to across base-emitter circuit of the transistor Q1 to control the switched state thereof. It can be shown that the voltage $Vd$ is proportional to the load voltage $VL$ appearing across the fluorescent lamp F, and therefore the voltage $Vd$ can be used to compensate for any variations in the load voltage $VL$. This may be seen from the following. With the transistor Q1 in its conductive (on) state:

$$Vt\ (on) = Vb$$

and with the transistor Q1 in its non-conductive (off) state:

$$Vt\ (off) = Vb - VL$$

The primary transformer voltage $Vt$ is related to the secondary voltage $Vs$ by the turns ratio of the transformer T1 so that:

$$Vt = rVs$$

where $r$ is the ratio of the number of turns on the primary winding $Lp$ to the number of turns on the secondary winding $Ls$. It follows with the transistor Q1 conductive:

$$Vs(on) = \frac{Vb}{r}$$

and with the transistor Q1 turned off $$Vs(off) = \frac{Vb - VL}{r}$$

The peak-to-peak value V's of the voltage Vs is then given by:

$$V's = Vs(\text{on}) - Vs(\text{off}) = \frac{Vb}{r} - \left(\frac{Vb - VL}{r}\right)$$

$$V's = \frac{VL}{r}$$

Thus, the peak-to-peak detected voltage Vd at the output of the peak-to-peak detector C1–D1 is proportional to the load voltage VL. This proportionality thereby provides feedback control for the fluorescent lamp F, in that the fluorescent lamp has a negative resistance characteristic so that as the voltage thereacross increases the current therethrough will decrease and vice versa. Hence, if the voltage across the fluorescent lamp F should decrease from its otherwise normal operating value, the negative impedance characteristic of the lamp F will cause the lamp current to increase. With a decreased load voltage VL the peak-to-peak detected voltage Vd also will decrease which in turn decreases the base drive to the transistor Q1 through the resistor R1. The transistor Q1 will thereby remain on a shorter time causing the current $i$ flowing in the primary winding Lp of the transformer T1 to decrease. Because the current $i$ through the winding Lp equals the fluorescent lamp current when the transistor turns off, the lamp current is decreased. The decrease in lamp current thereby increases the lamp load voltage VL due to the negative resistance characteristic thereof and returns the lamp voltage in the direction of its normal operating value. By such feedback action the load voltage VL is stabilized across the fluorescent lamp F, with the voltage Vd proportional to the load voltage VL controlling the conductivity of the transistor Q1 in such a fashion that the load current $i$ is either increased or decreased to compensate respectively for decreases or increases in the load voltage VL.

In summary it can be seen that the inverter circuit of FIGURE 1 provides a highly economical design in utilizing only a single transistor Q1 and also permits operation at highly efficient levels by the use of the inductance coil Lp as a ballast element for the fluorescent lamp F. Moreover, a stable light output is provided by the fluorescent light F relatively independent of fluctuations in the battery voltage Vb due to the feedback control provided via the secondary winding Vs and the peak-to-peak detector C1–D1.

Although the present invention has been described with a certain degree of particularity, it should be understood that the present disclosure has been made only by way of example and that numerous changes in the details of construction and circuitry and the combination arrangement of parts, elements and components can be resorted to without departing from the spirit and the scope of the present invention.

I claim:

1. An inverter circuit operative with a DC source for supplying a load comprising:
    a switching device including output and control electrodes, said load being operatively connected across the output electrodes of said device;
    a first inductive element operatively connected between said DC source and said device and load for supplying current therethrough to said device when said device is conductive and to said load when said device is non-conductive;
    a second inductive device inductively coupled to said first inductive element; and
    detecting means operatively connected between said second inductive element and the control electrode of said device for supplying a control voltage to said device proportional to the voltage developed across said load.

2. The inverter circuit of claim 1 wherein:
    said load comprising a fluorescent lamp having a negative resistance characteristic.

3. The inverter circuit of claim 2 wherein:
    said detecting means comprising a peak-to-peak detector for providing said control voltage by peak-to-peak detecting the voltage applied thereto from said second inductive element.

4. The inverter circuit of claim 2 wherein:
    said first and second inductive elements comprising first and second windings, respectively, on a magnetic core,
    said current through said first winding being normally insufficient to saturate said magnetic core.

5. The inverter circuit of claim 3 wherein:
    said peak-to-peak detector comprising a capacitor having one side thereof operatively connected to said second inductive element for receiving the voltage developed thereacross, and a unidirectional device operatively connected to the other side thereof for peak-to-peak detecting the voltage applied to said capacitor, said other side of said capacitor operatively connected to said control electrode of said switching device.

6. The inverter circuit of claim 4 wherein:
    said switching device comprising a transistor having base, collector and emitter electrodes, said collector and emitter electrodes comprising said output electrodes and said base electrode comprising said control electrode.

7. The inverter circuit of claim 6 wherein:
    said first winding operatively connected in series with the collector-emitter circuit of said transistor, and said fluorescent lamp connected across the collector-emitter circuit of said transistor.

8. The inverter circuit of claim 7 wherein:
    said detector means comprising a peak-to-peak detector including a capacitor having one side operatively connected to said second winding for receiving the voltage developed thereacross, and a diode operatively connected to the other side thereof for peak-to-peak detecting the voltage applied to said capacitor, said other side of said capacitor operatively connected to said base electrode of said transistor.

9. The inverter circuit of claim 6 including:
    a Zener diode operatively connected between said base and collector electrodes of said transistor for protecting the collector-base junction thereof from reverse voltage damage.

10. The inverter circuit of claim 6 including:
    switching means operatively connected across said fluorescent lamp for instigating the lighting thereof at startup of the inverter circuit operation.

References Cited

UNITED STATES PATENTS

| | | | |
|---|---|---|---|
| 2,797,327 | 6/1957 | Kidd | 331—115 X |
| 3,165,668 | 1/1965 | Harpley | 315—209 |
| 3,334,619 | 8/1967 | Penn | 331—112 X |

JAMES W. LAWRENCE, Primary Examiner

C. R. CAMPBELL, Assistant Examiner

U.S. Cl. X.R.

315—99, 207; 331—115